April 13, 1926.
E. D. PUTT
1,580,916
MACHINE FOR CUTTING MATERIAL ON THE BIAS
Original Filed June 4, 1921  3 Sheets-Sheet 1
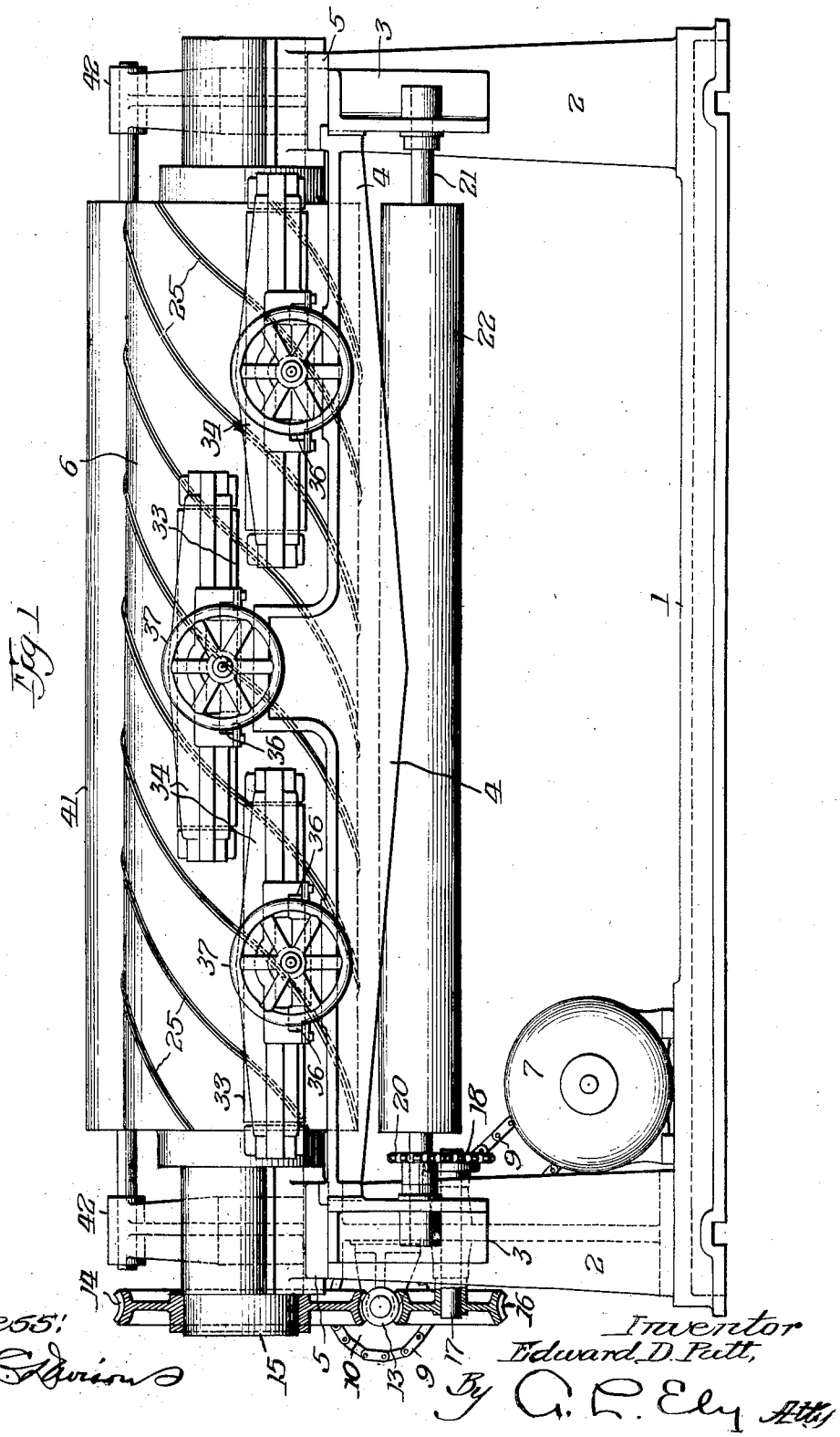

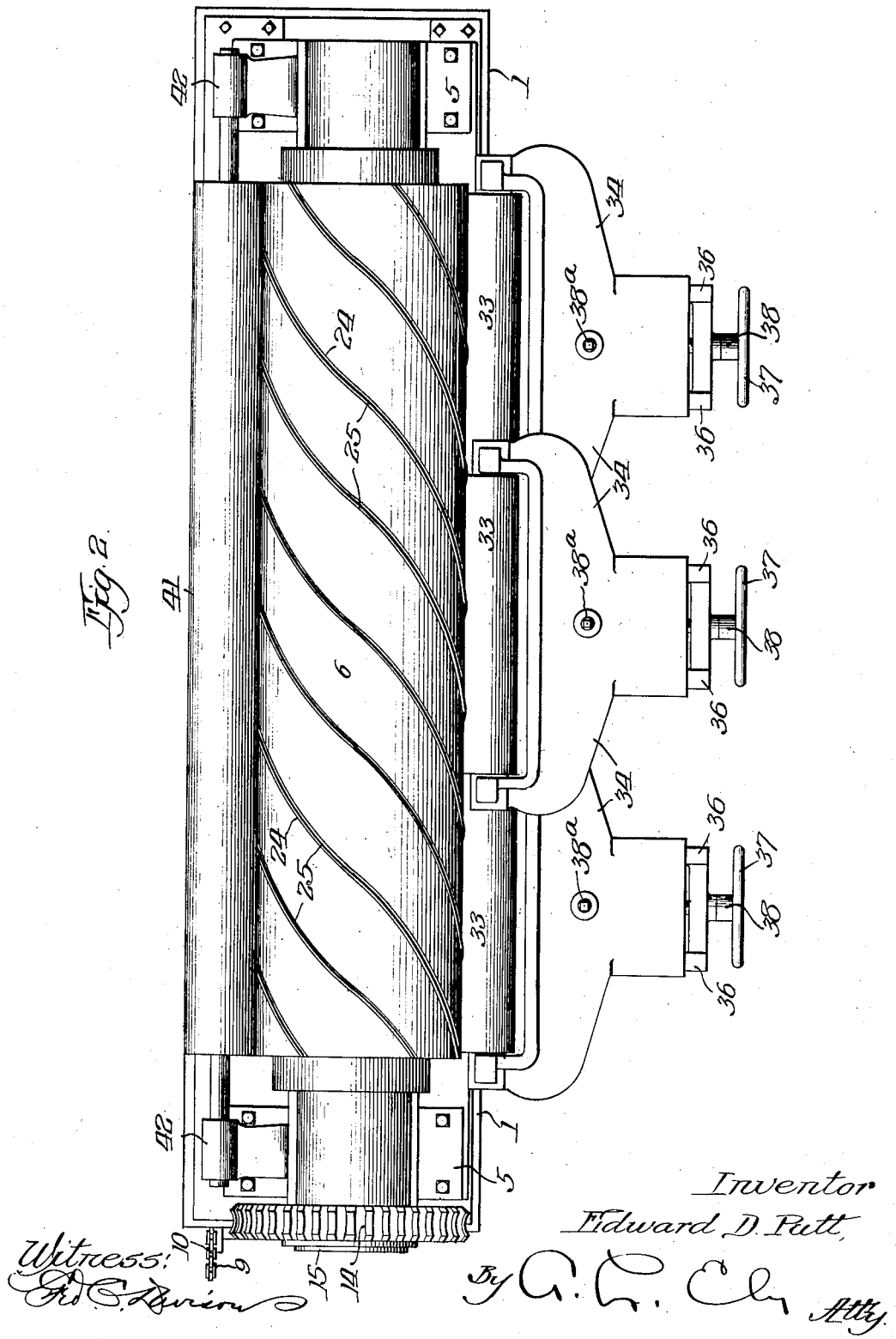

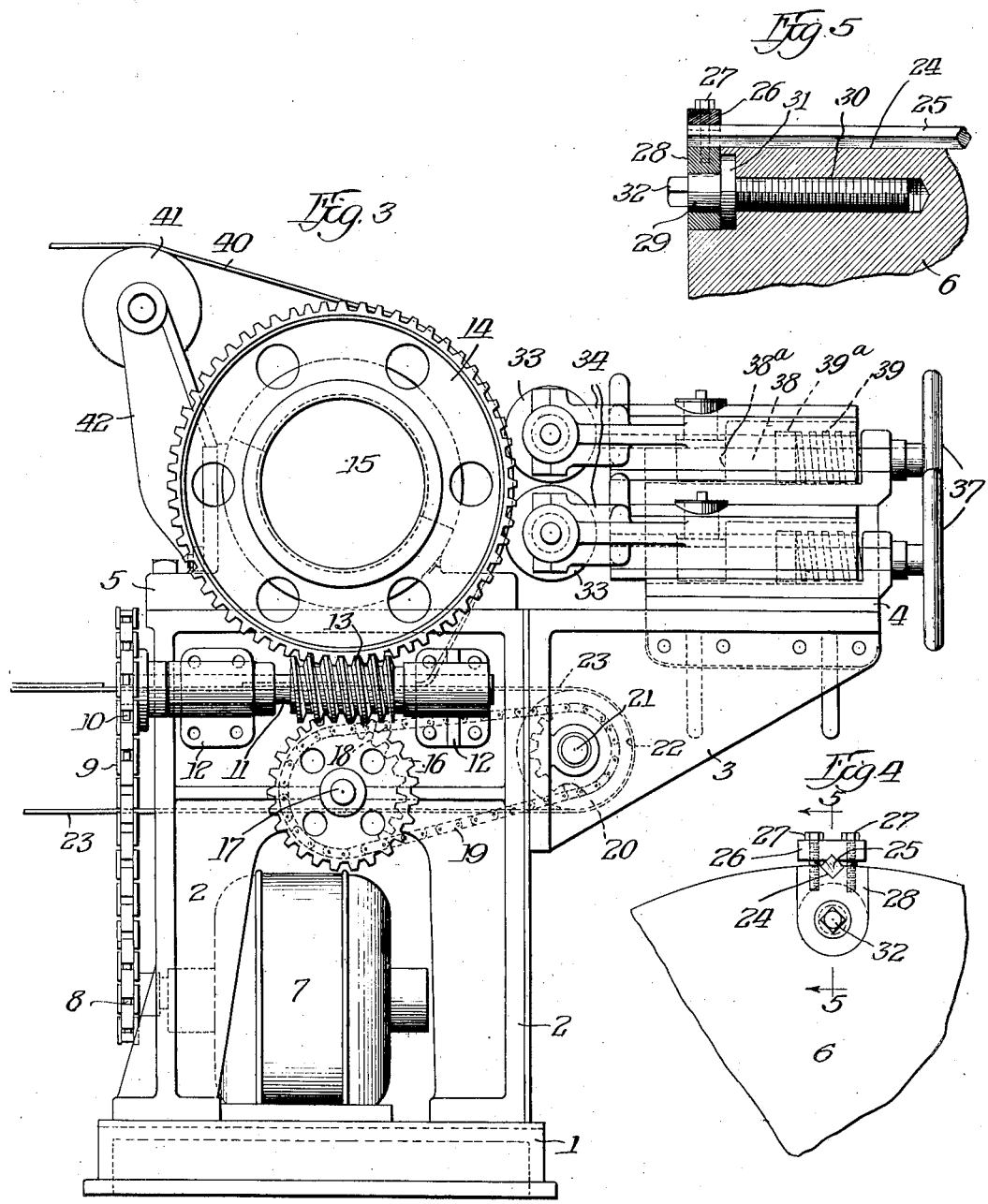

Patented Apr. 13, 1926.

1,580,916

UNITED STATES PATENT OFFICE.

EDWARD D. PUTT, OF AKRON, OHIO, ASSIGNOR TO THE FIRESTONE TIRE AND RUBBER COMPANY, OF AKRON, OHIO, A CORPORATION OF OHIO.

MACHINE FOR CUTTING MATERIAL ON THE BIAS.

Application filed June 4, 1921, Serial No. 475,021. Renewed December 30, 1925.

*To all whom it may concern:*

Be it known that I, EDWARD D. PUTT, a citizen of the United States, residing at Akron, in the county of Summit, State of Ohio, have invented certain new and useful Improvements in a Machine for Cutting Material on the Bias, of which the following is a specification.

The invention relates to machinery for cutting material for various purposes, but it is particularly intended and adapted for use in factories engaged in the manufacture of automobile tires, or similar products. In the manufacture of pneumatic tires for automobiles and in similar operations, it is necessary to have lengths of fabric which are cut at an angle of 45° to the length of the original fabric, or, as is termed in the art " on the bias ". For performing the cutting operation there have been in common use two types of machines. One of these types is found in a machine in which the fabric has been severed by a vertically operating shear set at an angle of 45°, the fabric being drawn under the knife by reciprocating gripper fingers. Another type of machine in general use, is provided with a reciprocating blade which travels in a diagonal line across the fabric held in a vertical plane, the fabric being clamped in position by an intermittently operating clamp bar, and being fed forward and allowed to drop by gravity to provide a new cut.

While both types of machine have operated satisfactorily, the cost of their upkeep is very high and the operations are relatively slow. By the machine designed and shown here, the work of cutting the fabric is done more rapidly and accurately than is possible with the machines of the earlier types. The machine designed by me operates on quite a different principle than those previously in use and gives more satisfactory results than have been possible heretofore.

While the drawings and description accompanying this application are quite detailed, it is not my intention to limit myself to such a detailed embodiment of the invention as I believe that this is the first machine of its type to successfully cut fabric on the bias. I am therefore, entitled to such a broad range of equivalents as may be allowable.

In the drawings:

Fig. 1 is a front elevation of my improved form of bias cutter.

Fig. 2 is a plan view thereof.

Fig. 3 is a side elevation.

Fig. 4 is a detail showing the manner of holding the knife blade.

Fig. 5 is a section on the line 5—5 of Fig. 4.

The machine for cutting fabric at an angle of 45°, or at any other angle, if desired, comprises a roller on the surface of which are secured a number of helical blades arranged at the desired angle or pitch, to the axis of the cylinder, and the fabric is led over this roller and pressed against it by one or more pressure devices so that it is severed in strips at the required angle. In this way the fabric is cut as fast as it can be passed through the machine and the cuts are made accurately and all danger of faulty cuts is eliminated. Furthermore the fabric is always in smooth condition and wrinkled or badly cut fabric is impossible.

The machine rises from a base 1 at the sides of which are mounted two standards or uprights 2, which support the operating parts of the machine. From one side of the standards are projected a pair of brackets 3 which support a table or platform 4, on which are mounted the pressure rollers. On the upper surface of the standards are carried bearings 5, which form the support for a knife or blade carrying cylinder 6.

On the base of the machine is mounted a motor 7, the shaft of which carries a sprocket 8, over which is trained a chain 9, which in turn drives a sprocket 10 on a drive shaft 11, mounted in bearings 12 on the side of one of the standards 2. Between the bearings 12 the shaft carries a worm 13, which meshes with a large worm 14 on the ends of the shaft 15 of the cylinder 6. The worm also meshes with a gear 16 on the end of a shaft 17, suitably mounted in bearings in the frame of the machine. Shaft 17 carries a sprocket 18 which drives through a chain 19, a second sprocket 20 on the shaft 21 of a long pulley 22, supported in the brackets 3.

This pulley serves as a means for supporting and driving a belt 23 which carries off the cut fabric. The speed of the belt may be suitably timed, but it is preferred to drive it slightly faster than the knife cylinder, so that the pieces of cut fabric are separated to a certain extent as they are delivered by the knife drum.

The surface of the cylinder 6 is provided with a plurality of grooves 24 in which are seated the knife blades 25. The pitch and spacing of the grooves may be varied as found necessary, but for the purposes of making the invention clear, it will be assumed that the grooves are given a pitch of 45° so that the fabric will be cut at 45° to its center line. The blades may be of any desired shape, being here shown as flexible wires or bars which are square in cross section, the grooves 24 being shaped to hold the blades with one edge exposed. The method of holding the blades in position will admit of many variations, the method provided here consisting in mounting cap plates 26 over the ends of the blades, which plates are securely held down by bolts 27 received in adjustable bearing plates 28 set into the surface of the drum 6. The blades 25 are set in position in the drum and clamped in place by the plates 26. After the blades are clamped in position, they may be drawn taut by drawing the adjustable bearing plates outwardly. In order to obtain this adjustment each plate 28 is passed over the smooth outer end of a shaft 29 which is screw threaded at its inner end to engage in a screw threaded bore 30 opening from the side of the drum 6. Directly behind the plate 28 the shaft is provided with a collar 31 and at its outer end with a squared head 32 to receive a wrench. By turning the shafts 29 so that the plates 28 will be fed outwardly the blades 25 are brought down tightly into the grooves. The four edges of the blades are cutting edges so that by turning the blade over a new cutting surface may be exposed. In this way the life of each blade will be materially lengthened.

The blades are spaced apart a suitable distance to make strips of proper widths and the circumference of the drum should be of the proper size so that even cuts will be produced.

At a convenient point about the drum, there is arranged a suitable pressure device which forces the fabric against the bladed drum. This may be embodied in any desirable means, the one which I have shown herein being in the form a plurality of spring held pressure rollers which bear against the surface of the drum and press the fabric on to the blades.

The rolls which I have shown are three in number and are arranged across the drum in échelon. Each roll is cylindrical and is indicated by the numeral 33 being rotatively mounted in forked arms 34, which are slidably mounted on guideways or tracks 36 found on the platform 4. The arms 34 are adjusted to and from the surface of the knife cylinder by hand wheels 37 the shafts 38 of which are threaded into nuts 38ᵃ. Springs 39 are arranged about the shafts 38 and bear against a collar 39ᵃ on the shaft, providing yielding pressure for the rolls. In order that the operation of the machine may be smooth the knives are so arranged on the cylinder 6 that each roller will engage one knife before leaving another and there will be at least two-point contact of the roller with the cutting edges at all times.

The material to be cut, which is usually the rubberized fabric used in building of tire casings, is indicated by the numeral 40 and comes from any suitable supply, being led over a guide roll 41 supported in bearings 42. The fabric passes around the drum in substantially circumferential condition so as to insure accurate cutting and is pressed into the blades by the pressure rollers and is severed at the proper angle and in proper widths. The cut fabric falls on to the off carrying belt 23.

While the term "cut" has been used throughout the specification, it will be evident that the action of the machine is more nearly similar to a pinching operation. As the wires or bars forming the cutting elements are square or approximately so, a heavy pressure is required to force the fabric into the wires so as to cut or pinch it off. In the cutting of rubberized fabric by this machine it is believed to be more satisfactory to use a pinching action to sever the fabric into the strips as required.

The mechanism which I have devised is simple and easily operated and its action is much more rapid than the action of prior bias cutters. The forms of the blades and the pressure rollers may be varied and other specific embodiments of the invention may be developed. Other changes and modifications may be made and will appear suitable and I am not limited to exact forms or proportions.

I claim:

1. A machine for cutting rubberized fabric on parallel diagonal lines, comprising a roller having a plurality of parallel helical grooves thereon, wires partially received in the grooves, means for longitudinally tensioning the wires to draw them into the grooves, means for conducting fabric over the roller, and means for forcing the fabric against the wires to sever it.

2. A machine for cutting rubberized fabric on parallel diagonal lines, comprising a roller having a plurality of helical grooves about its surface, wires seated within said grooves, by longitudinal tension thereon, means for holding said wires under longitudinal tension, means for conducting fabric over the roller, and a smooth cylindrical roller bearing against the fabric to force it against the wires.

3. A machine for cutting rubberized fabric on parallel lines, comprising a roller having a plurality of parallel grooves on its surface, wires partially seated in said grooves, means engaging the ends of said wires and adapted to exert tension thereon, means for conducting fabric over the roller, a smooth cylindrical roller, and yielding pressure means to force the cylindrical roller against the fabric and against the exposed surfaces of the wires.

4. A machine for cutting rubberized fabric on parallel diagonal lines, comprising a roller having a plurality of grooves arranged about its surface in parallel helixes, cutting wires held in said grooves by longitudinal tension therein, means for holding said wires under longitudinal tension, a pressure roller, means to force the pressure roller against the wires, and means to conduct fabric between the rollers.

5. A machine for cutting rubberized fabric on parallel diagonal lines, comprising a roller having a plurality of parallel helical grooves which are angular in cross-section, cutting wires square in cross-section fitted into said grooves with one edge exposed above the surface of the roller, means for holding the wires in the grooves by exerting longitudinal tension thereon and a pressure roller adapted to force the fabric against said wires.

6. A machine for cutting rubberized fabric on parallel diagonal lines, comprising a roller having a plurality of parallel helical grooves, cutting wires seated within said grooves and extending above the surface of the roller, means attached to the end of the wires and adapted to exert tension thereon, and means for forcing the fabric against the wires.

7. A machine for cutting rubberized fabric on parallel diagonal lines, comprising a roller, a plurality of flexible cutter wires placed in parallel helixes across the roller, means for exerting tension on the wires to cause them to lie against the surface of the drum, and a pressure roller adapted to force the fabric against the wires.

8. A machine for cutting material, comprising a roller, a plurality of flexible cutter wires placed on the surface of the roller, means for holding the wires under tension on the roller and means for forcing the material against the wires.

9. A machine for cutting material, comprising a roller having a groove thereon, a flexible cutter wire received in the groove and projecting above the surface of the roller, means for exerting tension on the wire to cause it to seat within the groove, and means to force the material against the wire.

10. A machine for cutting material, comprising a roller, a flexible cutter wire on the outer surface of the roller, means for exerting a longitudinal strain on the wire to cause it to hug the roller, and means for forcing the material onto the wire.

11. A machine for cutting material, comprising a roller having a groove therein, a flexible cutter wire filling the groove and projecting above the surface of the roller, means engaging an end of the wire and adapted to exert a longitudinal strain thereon, and means for forcing the material onto the wire.

12. A machine for cutting material, comprising a roller having an angular groove therein, a flexible wire angular in cross-section filling the groove and projecting above the surface of the roller, means for holding the wire in the groove by exerting longitudinal tension thereon, and means to force the material onto the wire.

13. A machine for cutting material, comprising a roller having a groove therein, a flexible wire having a plurality of cutting surfaces, said wire filling the groove and projecting above the surface of the roller, means to engage an end of the wire and exert tension thereon to cause it to seat within the groove, and means to force the material against the wire.

14. A machine for cutting material, comprising a roller having a plurality of parallel helical grooves therein, flexible wires each having a plurality of cutting surfaces, said wires filling the grooves and projecting above the surface of the roller, means adapted to clamp an end of the wires and exert tension thereon to cause them to seat within the grooves, and means to force the material against the wires.

15. A machine for cutting rubberized fabric in parallel bias strips, comprising a rotating roller, a plurality of parallel helical wires held on said roller under tension, and a second roller yieldingly pressed against the first said roller, the fabric being passed between the said rollers and pinched thereby.

16. A rotary cutter comprising a roller, a flexible knife arranged throughout its length on the surface of the roller, and means for holding the knife on the surface of the roller by exerting longitudinal tension thereon.

17. A rotary cutter comprising a roller, a flexible knife helically arranged about the roller and means for applying longitudinal tension to said knife.

18. A rotary cutter comprising a roller, a flexible knife arranged on the roller, means for holding the knife on the roller by exerting longitudinal tension thereon, a second roller for pressing material against said knife and means whereby the pressure between the knife and the second roller is yielding.

19. A rotary cutter comprising a roller, a series of spaced knives on the roller, a second roller adapted to press material against the knives and means for leading material onto said first roller whereby the material is carried in substantially circumferential condition between the first and second rollers.

20. A rotary cutter comprising a roller, a series of spaced knives on the roller, means cooperating with the knives for cutting material and means for conducting the material to the roller whereby it will be in substantially circumferential condition thereon as it is being cut.

21. A rotary cutter comprising a rotary drum, a series of spaced knives on the surface of the drum, means for causing material to travel in a path concentric to the periphery of said drum and means for pressing the material against the knives.

22. A rotary cutter comprising a roller and a flexible knife helically mounted on said roller, the knife being retained in engagement therewith throughout its length by means engaging the knife only adjacent its ends.

23. A rotary cutter comprising a roller and a flexible knife wrapped onto the surface of said roller, said knife being retained on the surface of the roller substantially throughout its length by means engaging the knife only adjacent its ends.

24. In a cutter for sheet material, the combination with a knife-holding drum, a flexible knife wound helically on the drum and means for securing the knife on the drum, of a cylindrical roll adapted to coact with said drum in a rotary cutting action upon the work, said drum being of such size in respect to the angle at which said knife lies thereon that said roll passes from the following end of said knife before it again contacts with the leading end thereof.

25. In a cutting machine, a roller having a helical groove therein, a wire wrapped on the roller and partially received in the groove, and means coacting only with the ends of the wire for holding said wire in said groove.

EDWARD D. PUTT